US007436288B2

(12) United States Patent
Shin

(10) Patent No.: US 7,436,288 B2
(45) Date of Patent: Oct. 14, 2008

(54) REMOTE CONTROL EQUIPMENT AND A CONTROL METHOD THEREOF

(76) Inventor: Hyun-Oh Shin, D-101, Kumgok-vila, 158-7 Kumgok-dong, Namyangju-si, 472-010 Kyunggi-do (KR)

( * ) Notice: Subject to any disclaimer, the term of this patent is extended or adjusted under 35 U.S.C. 154(b) by 421 days.

(21) Appl. No.: 10/505,627

(22) PCT Filed: Feb. 21, 2003

(86) PCT No.: PCT/KR03/00358

§ 371 (c)(1),
(2), (4) Date: Mar. 14, 2005

(87) PCT Pub. No.: WO03/077590

PCT Pub. Date: Sep. 18, 2003

(65) Prior Publication Data

US 2005/0151626 A1 Jul. 14, 2005

(30) Foreign Application Priority Data

Feb. 21, 2002 (KR) ...................... 10-2002-0009210
May 22, 2002 (KR) ...................... 10-2002-0028311

(51) Int. Cl.
*H04M 11/04* (2006.01)

(52) U.S. Cl. ................................................ 340/310.11

(58) Field of Classification Search ............ 340/310.01, 340/310.11, 825.69, 532, 825.25
See application file for complete search history.

(56) References Cited

U.S. PATENT DOCUMENTS 5,777,545 A * 7/1998 Patel et al. ............. 340/310.16
5,815,086 A * 9/1998 Ivie et al. ............... 340/825.52
6,229,432 B1 * 5/2001 Fridley et al. .......... 340/310.14
6,750,781 B1 * 6/2004 Kim ...................... 340/825.69

FOREIGN PATENT DOCUMENTS

JP 5-115088 A 5/1993
JP 9-233568 A 9/1997
JP 2000-324569 A 11/2000

OTHER PUBLICATIONS

Abstract of KR9513166, Appl. No. 1992-15277, published Oct. 25, 1995, entitled "Remote Switching Device Using Frequency Signal".

* cited by examiner

*Primary Examiner*—Brian Zimmerman
*Assistant Examiner*—Nabil H Syed
(74) *Attorney, Agent, or Firm*—The Webb Law Firm, P.C.

(57) ABSTRACT

Remote control equipment and a control method thereof, whereby load devices can be remotely controlled selectively through transmission and reception of a specific frequency signal using power and dedicated lines. The remote control equipment includes transmitting and receiving ends. The transmitting end includes a line filter, a power supply section, an oscillator/amplifier, a frequency, a remote control keyboard, a remote control signal controller, a telephone signal controller, a synchronous frequency-transmitter, and a light emitting section including an LED. The receiving end includes a synchronous frequency-detector, a signal latch section, a reverse signal converter, an optical transmitter, a relay driver, a detector, and a light emitting section including an LED. Information on the state of a load obtained by detecting a current in the load is reverse-transmitted to the transmitter to be displayed by the LED.

11 Claims, 8 Drawing Sheets

REMOTE CONTROL EQUIPMENT AND A CONTROL METHOD THEREOF

TECHNICAL FIELD

The present invention relates to remote control equipment capable of controlling a load device located in a remote place, out of the range controllable by a general remote controller, and more particularly to remote control equipment and a control method thereof, whereby on/off switches of a load device can be selectively and remotely controlled by data transmission and reception on the basis of a specific frequency signal through a power line or a dedicated line.

For example, the present invention relates to a remote control method, wherein an optical signal, transmitted from a remote controller, is received and converted into frequency signal data, and it is then transmitted by a wired line, and the transmitted data is synchronously detected by a receiver connected to the wired line, and it is then converted back into an optical signal so as to control electronic products.

BACKGROUND ART

In order to selectively control a plurality of load devices connected to a power line, it is generally necessary to extract a separate switch wire from each of the load devices.

When implementing a control system for the plurality of load devices at home, it is required to provide a number of switch wires in a control panel, and thus the system's installation and maintenance are difficult, and the expense is very heavy. In addition, when data of a specific frequency signal of a transmitting end is transmitted to a receiving end, there is no way for the transmitting end to check the state of the receiving end to which the data is transmitted, and check the operating states of the load devices. Thus, since there is no way for the transmitter to check the transmission states, it is difficult to check whether or not the plurality of load devices operates.

Meanwhile, most of currently available electronic products as load devices employ a remote controller based on light emission for controlling their operations, which allows the operations to be remotely controlled, thereby promoting the convenience of life.

With the development of technology, use of the remote controller will be wider. Particularly, the importance of the remote controller having a remote control function are being emphasized much more, with the development of technology toward home automation which allows control of electronic products located at home from the outside with no person inside the home. However, such a control method based on the remote controller has limitations in that the electronic product can be controlled only when it is located in a range of positions eachable by an optical signal of the remote controller.

On the other hand, a remote control method based on a pulse signal control, or a wireless control method based on a high frequency wave, has an advantage in that, since the operation is not performed with frequencies other than its inherent frequency, there is no risk of malfunction caused by other signals, but it has a disadvantage in that the cost is increased by the manufacturing and replacement of the system.

SUMMARY OF THE INVENTION

The present invention has been made to overcome the above problems, and it is an object of the present invention to provide a remote control equipment and a method using the same, whereby a remote controlling is performed through a switch to allow a user to see and check transmission and reception states through a display unit, and limitations in the range controllable by a remote controller based on an optical signal is overcome to make it possible-to control load devices, such as electric devices and electronic products, located in a different place out of the range controllable by the remote controller.

It is another object of the present invention to provide a remote control equipment and a method using the same., wherein a control signal generated by a key button switch. (S/W) and a control signal generated by a telephone call from the outside are received and converted into optical signals and then transmitted, so that remote-controllable electronic products can be remotely controlled easily from the outside.

It is yet another object of the present invention to provide a remote control equipment and a method using the same, whereby home automation is realized inside home with the existing remote control scheme unchanged, without replacing a remote control equipment in the existing remote-controllable electronic products.

The present invention is an improvement of an invention entitled "REMOTE CONTROL SWITCH. DEVICE BASED ON FREQUENCY SIGNAL", which was filed by this Applicant in the Korean Intellectual Property Office on Aug. 25, 1992 and assigned a patent application No. 1992-15277, and was granted on Apr. 8, 1996 and assigned a patent registration No. 98019.

In accordance with one aspect of the present invention, the above and other objects can be accomplished by the provision of a remote control equipment comprising:

a line filter for preventing frequency signal data from being leaked to the outside through a power line;

a transmitting end including: a) a power supply section including a rectifier for converting an input AC voltage into a DC voltage and a constant voltage section for stabilizing the DC voltage output from the rectifier; b) an oscillator/amplifier for performing an oscillation and an amplification by the voltage supplied from the constant voltage section to output a clock signal; c) a frequency divider for receiving the clock signal of the oscillator/amplifier and outputting a plurality of frequency-divided signals; d) a remote control keyboard for performing a selection operation through a plurality of key switches so as to provide the output signal from the frequency divider, as a controller signal, to an amplifying circuit of the oscillator/ amplifier; e) a remote-control signal controller for controlling a remote control signal externally selected; f) a telephone signal controller for performing a control operation through a telephone line from the outside; g) a synchronous frequency-transmitter for transmitting selected frequency signal data to a power line or a dedicated line; and h) a light emitting section which is turned on in response to an input of a feedback signal generated as a light emitting section of a receiving end is turned on; and the receiving end including: i) a synchronous frequency-detector for detecting predetermined frequency signal data among a plurality of frequency-divided signals received by the power or dedicated lines; j) a signal latch section for receiving the synchronously-detected signal output from the synchronous frequency-detector and generating a signal-latch toggle output-level; k) a relay driver for controlling a relay used for switching on a load; l) a detector for detecting and transmitting the operating state of the load as the load is switched on; and m) the light emitting section which is turned on as the load is switched on.

In accordance with another aspect of the present invention, there is provided a remote control method using said remote control equipment, comprising the steps of:

a) entering a wait state if a selected switch signal is off, and checking whether it is possible to transmit the selected switch signal through a power line or a dedicated line, if the selected switch signal is on;

b), if the checked result is that the transmission is possible, checking transmitters so as to start a data transmission of a corresponding transmitter according to the waiting order;

c) operating a load by switching on a relay or a transistor by an output signal of a received transmission data, displaying an reception state of the receiver through an LED, and outputting the reception state and the operating state of the load to the transmission end;

d) receiving the data from the transmitter and displaying the operating state of the receiver through the LED; and e), if a transmitted and received frequency signal is coincident with a predetermined frequency signal, displaying the operating state through the LED, or, if they are not coincident, entering a transmission wait state.

BRIEF DESCRIPTION OF THE DRAWINGS

These and other features, aspects, and advantages of preferred embodiments of the present invention will be more fully described in the following detailed description, taken accompanying drawings. In the drawings.

DETAILED DESCRIPTION OF THE INVENTION

Figure 1:
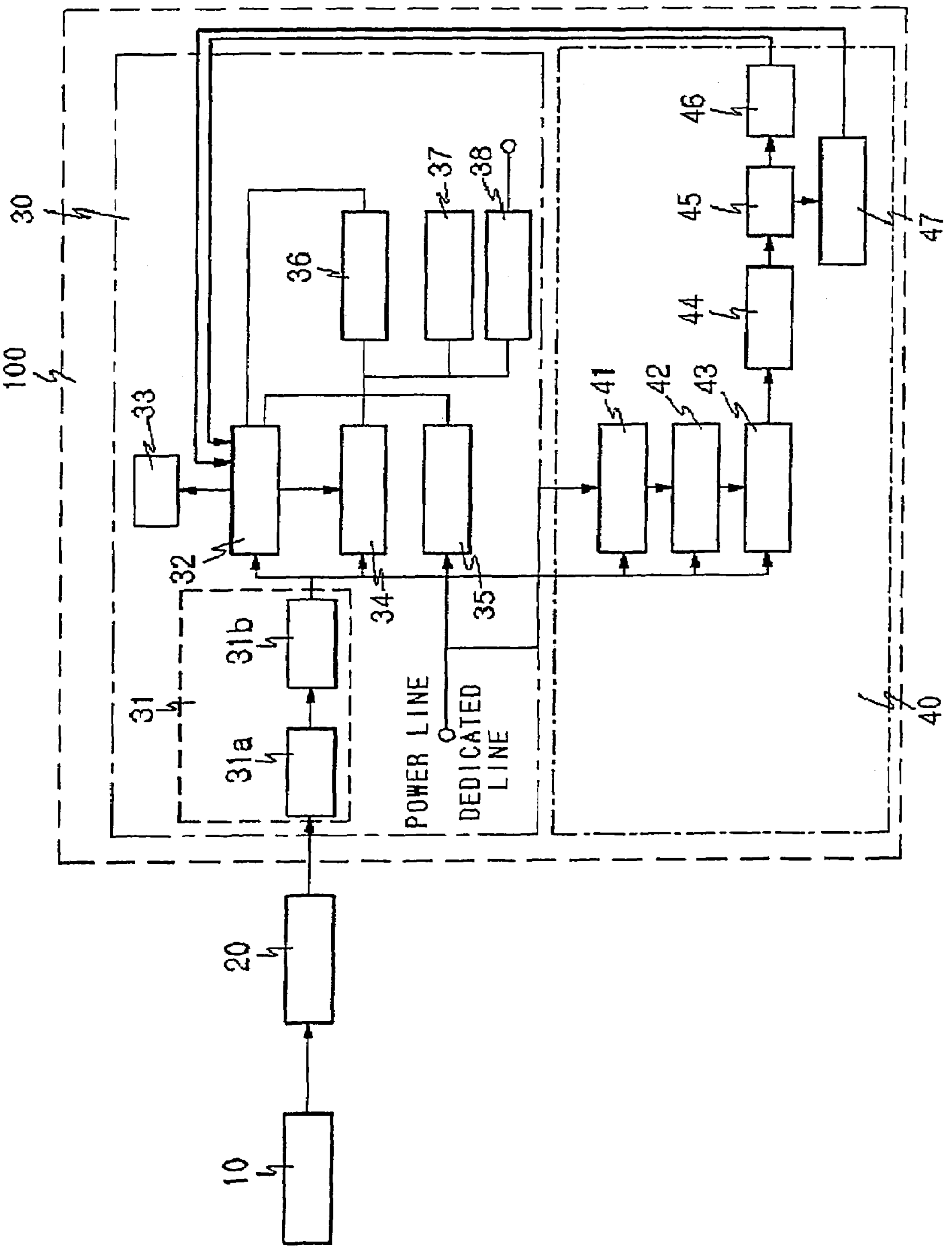
FIG. 1 is a block diagram showing an embodiment of a remote control equipment according to the present invention.

Hereinafter, the configuration and operation of an embodiment according to the present invention will be described referring to the drawings.

FIG. 1 is a block diagram showing an embodiment of a remote control equipment according to the present invention. As shown in FIG. 1, the remote control equipment comprises a line filter 20, a transmitting end 30 and a receiving end 40. The line filter 20 prevents frequency signal data of a transmitting and receiving section 100 from being leaked to the outside through a power line 10. The transmitting end 30 includes a) a power supply section 31 including a rectifier 31*a* for converting an input AC voltage into a DC voltage and a constant voltage section 31*b* for stabilizing the DC voltage output from the rectifier 31*a*, b) an oscillator/amplifier 32 for performing an oscillation and an amplification by the voltage supplied from the constant voltage section 31*b* to output a clock signal, c) a frequency divider 34 for receiving the clock signal of the oscillator/amplifier 32 and outputting a plurality of frequency-divided signals, d) a remote control keyboard 36 for performing a selection operation through a plurality of key switches so as to provide the output signal from the frequency divider 34, as a controller signal, to an amplifying circuit of the oscillator/amplifier 32, e) a remote-control signal controller 37 for controlling a remote control signal externally selected, f) a telephone signal controller 38 for performing a control operation through a telephone line from the outside, g) a synchronous frequency-transmitter 35 for transmitting selected frequency signal data to the power or dedicated lines, and h) a light emitting section 33 which is turned on in response to an input of a feedback signal generated as a light emitting section 46 of the receiving end 40 is turned on. The receiving end 40 includes i) a synchronous frequency-detector 41 for detecting predetermined frequency signal data among a plurality of frequency-divided signals received by the power or dedicated lines, j) a signal latch section 42 for receiving the synchronously-detected signal output from the synchronous frequency-detector 41 and generating a signal-latch toggle output-level, k) a relay driver 43 for controlling a relay 44 used for switching on a load 45, l) a detector 47 for detecting and transmitting the operating state of the load 45 as the load 45 is switched on, and m) the light emitting section 46 which is turned on as the load 45 is switched on. Of course, the transmitting end 30 and the receiving end 40 may be integrated into a single unit.

The remote control signal controller 37 includes an optical receiver for receiving an optical signal from a remote controller R, and a signal converter for detecting a wavelength of the optical signal received by the optical receiver 10 and determining the kind of a load coincident with a frequency corresponding to the detected wavelength so as to generate frequency signal data.

Display means corresponding to each load is additionally disposed on the remote controller R, and the display means includes a pair of LEDs of different colors for displaying an operating state and a non-operating state of the load, respectively.

The telephone signal controller 38 includes a signal converter for receiving a control signal generated by a telephone call and converting it into an inherent frequency signal data of the load.

The remote control keyboard 36 includes a signal converter for receiving a control signal generated by a key button switch and converting it into an inherent frequency signal data of the load.

The receiving end further includes a reverse signal converter for converting the detected frequency signal data back into an optical signal, and an optical transmitter for transmitting the optical signal converted by the reverse signal converter so as to control the load.

The receiving end further includes a filter for removing noise generated while the frequency signal data is transmitted through the power or dedicated lines.

Meanwhile, the oscillator/amplifier 32, the frequency divider 34, and the synchronous frequency-transmitter 35 constitute a data transmitter, while the synchronous frequency-detector 41 and the signal latch section 42 constitute a data receiver.

The operation of an embodiment of the remote control equipment according to the present invention will now be described in detail.

An AC voltage supplied through the power line 10 and the line filter 20 is converted into a DC voltage by the rectifier 31*a* of the power supply section 31, and stabilized by the constant voltage section 31*b*, and it is then output to the transmitting end 30 and the receiving end 40. The DC power stabilized by the power supply section 31 is then provided to the oscillator/amplifier 32, and, after being oscillated, it is amplified so as to output a clock signal.

After the frequency divider 34 receives the clock signal of the oscillator/amplifier 32 and outputs a plurality of frequency-divided signals, the telephone signal controller 38, the remote control signal controller 37, the remote control keyboard 36 select a signal corresponding to a load to be operated, among the frequency-divided signals output from the frequency divider 34. Data of the selected frequency-divided signal is provided to an amplifier circuit in the oscillator/amplifier 32 to be amplified, and the amplified signal is transmitted from the synchronous frequency-transmitter 35.

When the selected signal of the transmitting end 30 is input to the synchronous frequency-detector 41 of the receiving end 40, the synchronous frequency-detector 41 detects a frequency coincident with 20 a predetermined frequency. Thereafter, the signal latch section 42 receives and latches the detected synchronous signal. Upon receipt of the latched signal, the relay driver 43 activates the relay 44. As the relay 44 is activated, the load 45 is switched on, whereby the light emitting section 46 including an LED (Light Emitting Diode) in the receiving end 40 is activated to emit light.

Determination as to whether the load 45 is activated is made by detecting a current provided to the load. A load activation signal detected from the detected current is then transmitted to the transmitting end 30.

Meanwhile, as the light emitting section 46 in the receiving end 40 emits light, its key switching signal is provided to the transmitting end 30, whereby the light emitting section 33 including an LED in the transmitting end 40 is activated to emit light. Namely, a reception state, in which a frequency signal of the transmitting end 30 is provided to the receiving end 40, is checked with the light emitting section 46 in the receiving end 40. Then, the receiving end 40 notifies the transmitting end 30 of the fact that the frequency signal is received, so as to activate the light emitting section 33 in the transmitting end 30 to emit light. This allows a user to confirm transmission and reception states of a message between the transmitting and receiving ends 30 and 40. This message means a message of the user through the power or dedicated lines.

Accordingly, the present invention allows the user to check the transmission and reception states by adding the LED to the remote control equipment.

Figure 2:
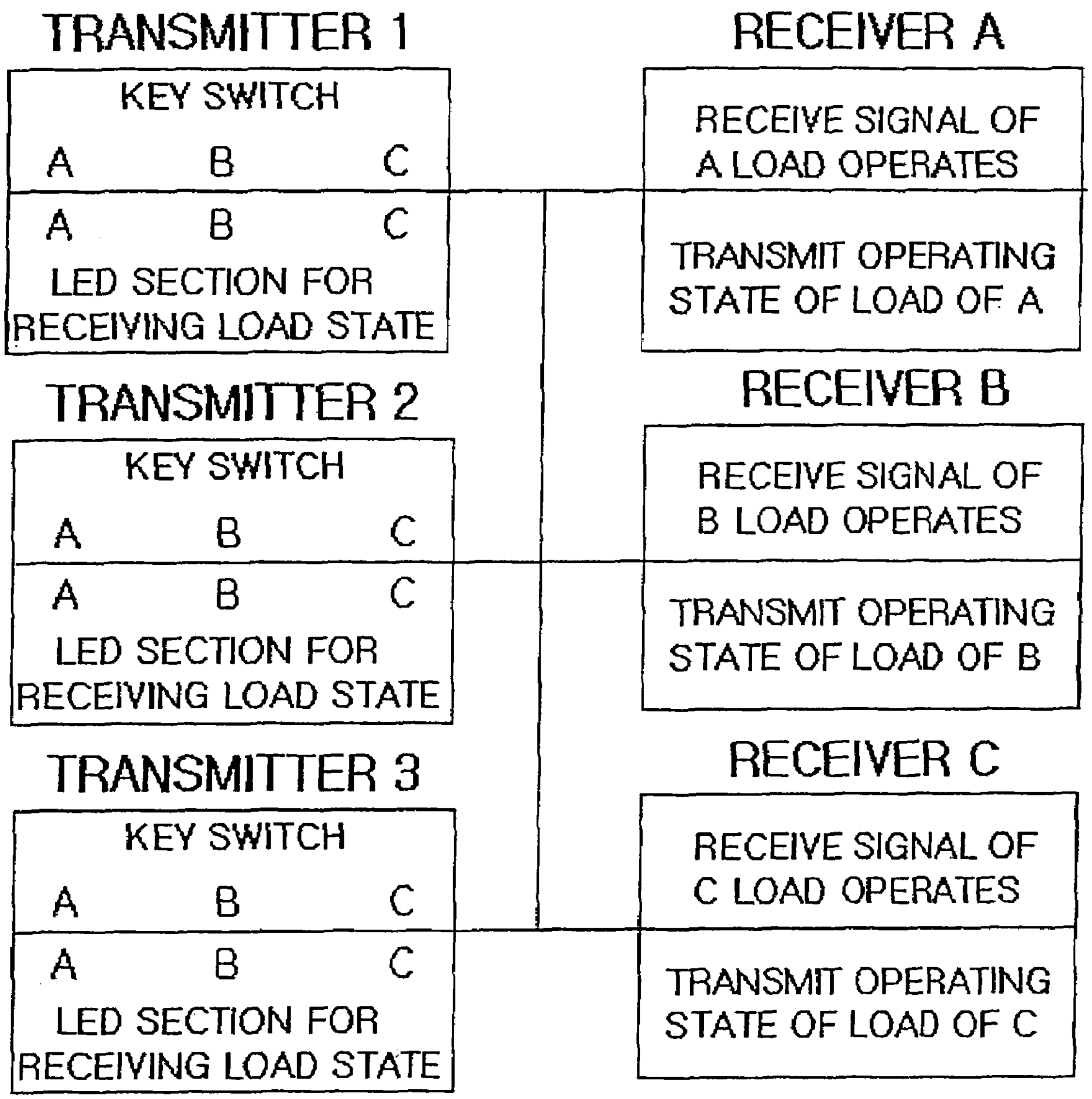
FIG. 2 is a block diagram showing an embodiment of a separation-type transmitter/receiver in a remote control equipment to which the present invention is applied.

FIG. 2 is a block diagram showing an embodiment of a separation-type transmitter/receiver in a remote control equipment to which the present invention is applied. The transmitter/receiver of the remote control equipment will now be described referring to FIG. 2.

As a key-A among key switches included in a transmitter 1 is pushed, a receiver-A receives the corresponding signal, which activates a load-A.

The receiver-A detects the flow of a current provided to the load-A by a load current detector, and transmits the corresponding signal to a transmitter. Transmitters 1, 2, and 3 receive back the transmitted signal, so that LEDs-A in the transmitters 1, 2, and 3 emit light to indicate that the load of the receiver-A is being operated. The transmitter and receiver can be integrated into a single unit.

Figure 3:
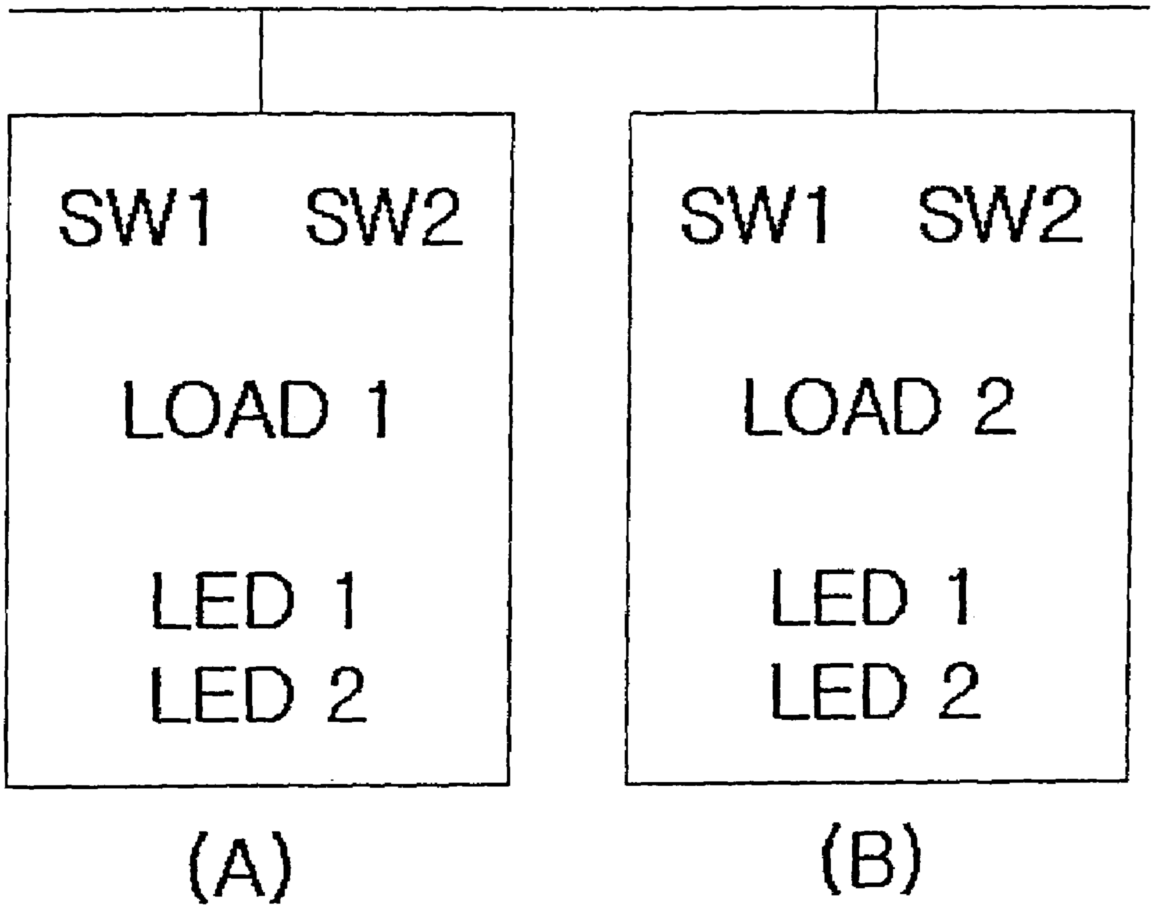
FIG. 3 is a block diagram showing an embodiment of an integrated-type transmitter/receiver of a remote control equipment to which the present invention is applied.

FIG. 3 is a block diagram showing an embodiment of an integrated-type transmitter/receiver of a remote control equipment to which the present invention is applied.

In the case where a transmitter and a receiver are integrated into a single unit, as shown in FIG. 3, when a switch 1 (sw1) in a transmitter/receiver-A is switched on, a load 1 and an LED 1 in the transmitter/receiver-A are turned on, and a signal corresponding to the operating state of the load 1 in the transmitter/receiver-A is transmitted to a transmitter/receiver-B. The transmitter/receiver-B receives the transmitted signal, so that an LED 1 in the transmitter/receiver-B is turned on.

In addition, when a switch 2 (sw2) in the transmitter/receiver-A is switched on, the transmitter/receiver-B receives a signal of the switch 2 in the transmitter/receiver-A, so that a load 2 and an LED 2 in the transmitter/receiver-B are activated. Then, when the transmitter/receiver-B transmits data indicating that the load 2 is activated, the transmitter/receiver-A receives the data, so that an LED 2 in the transmitter/receiver-A is turned on.

Figure 4:
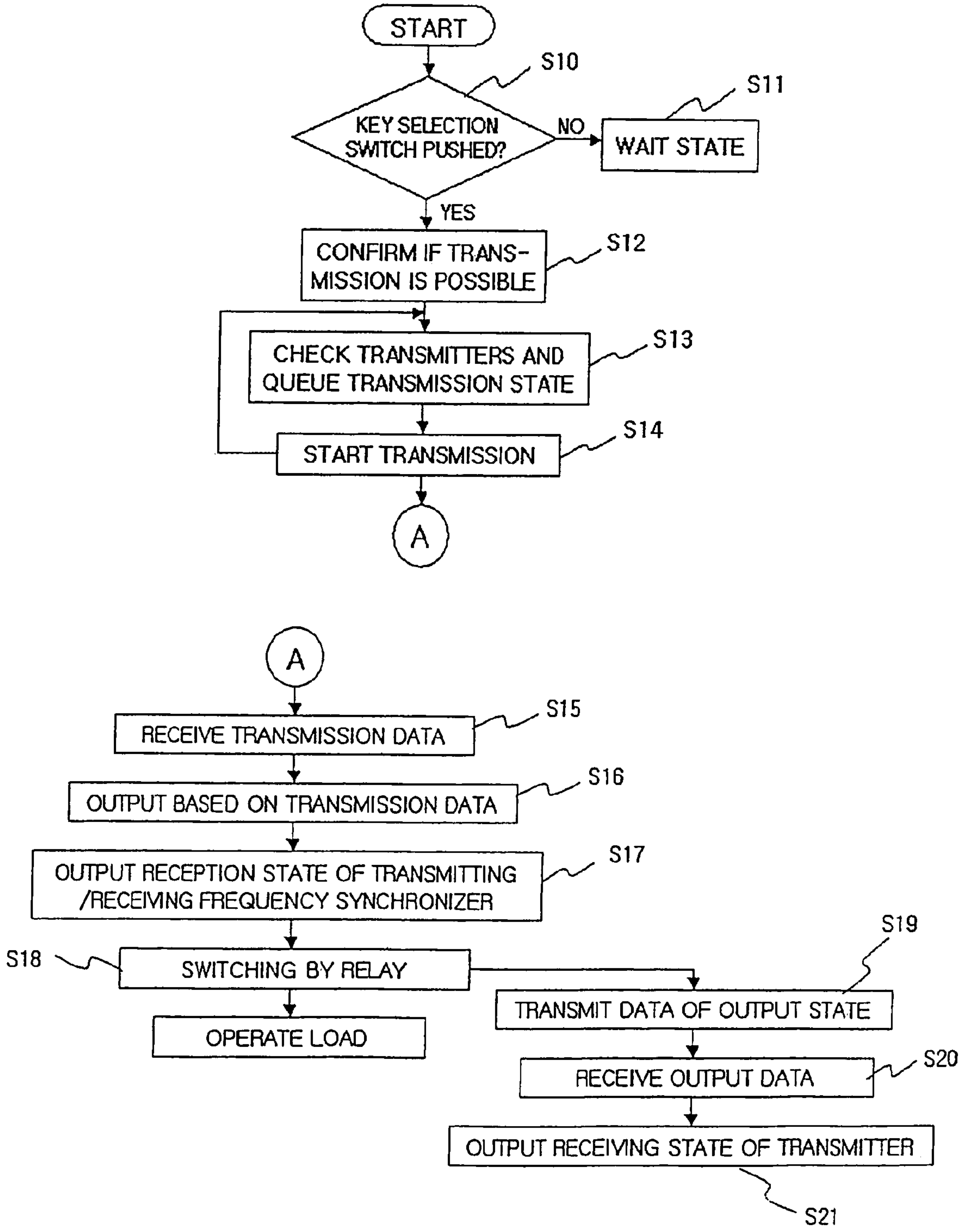
FIG. 4 is a flow chart illustrating a remote control method according to the present invention.

FIG. 4 is a flow chart illustrating a remote control method according to the present invention, which is described as follows.

If there is no selected signal, the operation enters a wait state, whereas if there is a selected signal, it is checked whether it is possible to transmit the signal through a power or dedicated line (S10 to S12).

If the checked result is that the transmission is possible, a check is made on transmitters, so as to start a data transmission of a corresponding transmitter according to the waiting order (S13 to S14).

A relay or a transistor TR is activated by an output signal of the received transmission data, thereby switching on the load, so as to output data on the reception state of the receiver, and thereafter the data is output to the transmitter (S15 to S19).

The state of the load is detected by detecting a current flowing in the load, and a signal of the detected load state is transferred to a different transmitter or a different transmitter/receiver, so that an LED is activated to indicate the operating state of the receiver or transmitter/receiver (S20 to S21).

On the other hand, when a predetermined frequency signal is coincident with a frequency signal input through the power or dedicated lines, or with frequency signals transmitted from the transmitter to the receiver and transmitted from the receiver to the transmitter, the LED is activated to indicate the transmission and reception states. Alternatively, when they are not coincident with each other, the operation enters a transmission wait state.

As mentioned above, according to the present invention, the remote control switch activates the LED to indicate the transmission and reception states, so that users can accurately confirm the transmission state.

Figure 5:
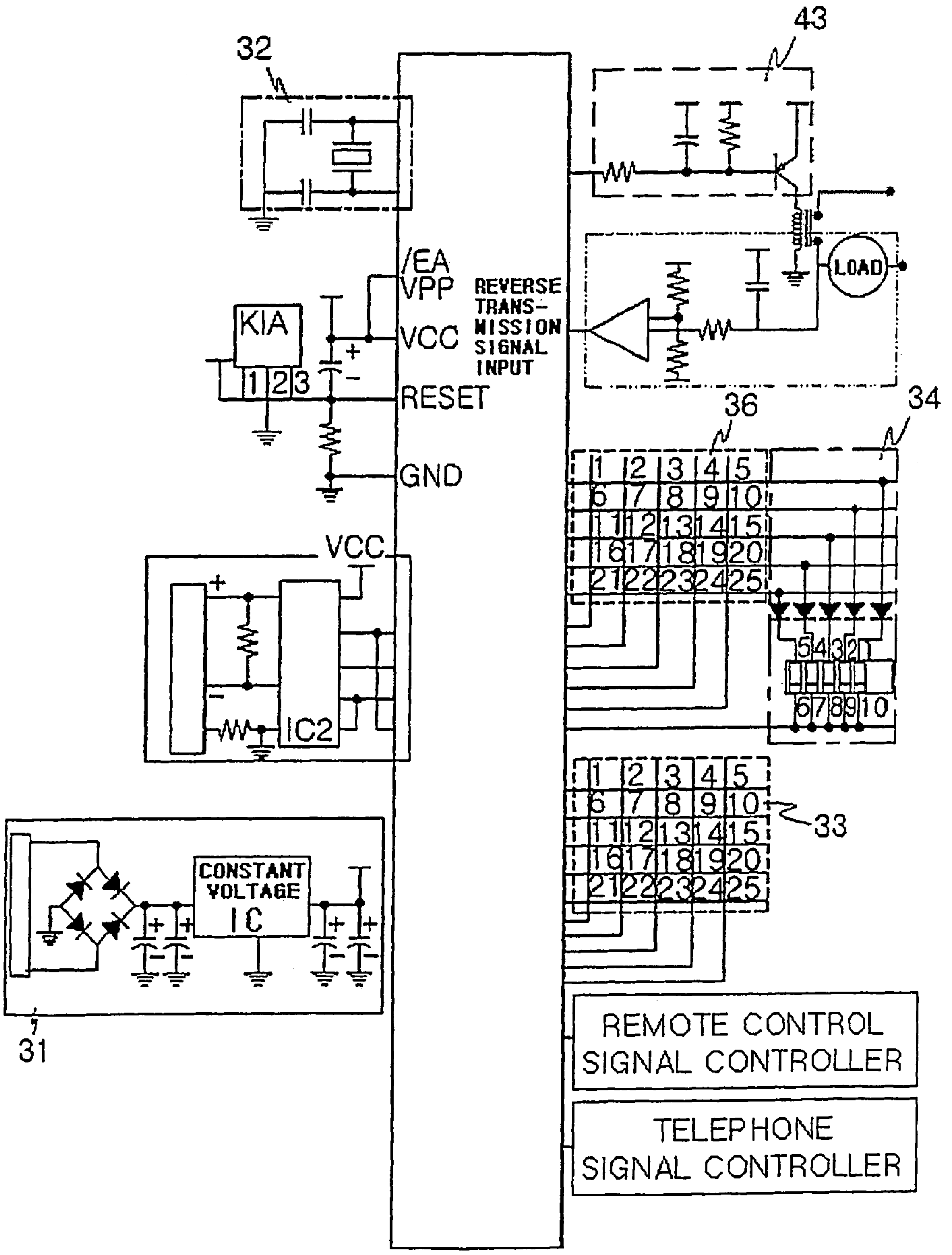
FIG. 5 is a circuit view showing an embodiment of a remote control equipment according to the present invention.
Figure 6:
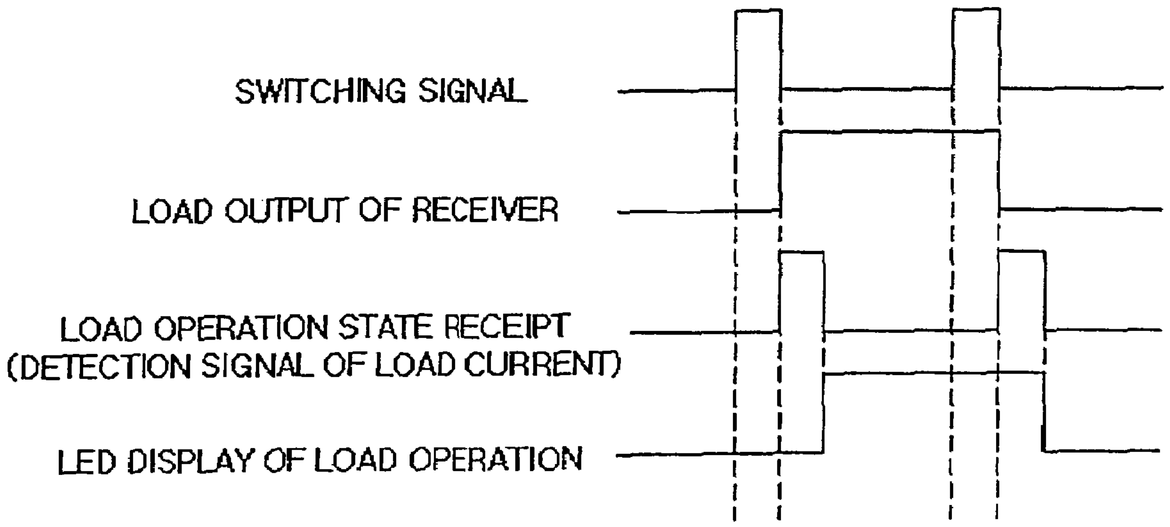
FIG. 6 is a view showing the waveform of signals in the remote control equipment according to the present invention.

FIG. 5 is a circuit view showing an embodiment of a remote control equipment according to the present invention, and FIG. 6 is a view showing the waveform of signals in the remote control equipment.

Figure 7:
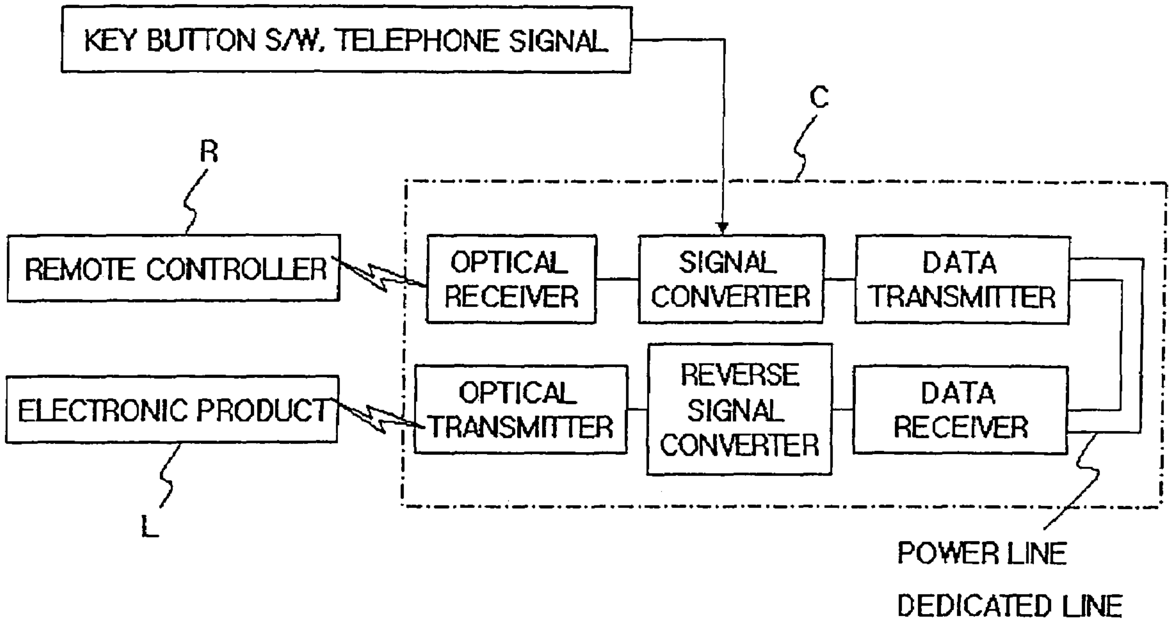
FIG. 7 is a block diagram showing a remote control equipment using a remote controller according to a detailed embodiment of the present invention.

FIG. 7 is a block diagram showing a remote control equipment using a remote controller according to a detailed embodiment of the present invention.

As shown in FIG. 7, the remote control equipment using the remote controller R according to the present invention includes an optical receiver, a signal converter, a data transmitter, a data receiver, a reverse signal converter, and an optical transmitter. The optical receiver receives an optical signal of the remote controller R. The signal converter detects the wavelength of the optical signal received by the optical receiver, and converts it into frequency signal data. The data transmitter transmits the frequency signal data generated from the signal converter to a wired line such as a power line and a dedicated line. The data receiver synchronously detects the transmitted frequency signal data. The reverse signal converter converts the frequency signal data back into the optical signal. The optical transmitter transmits the optical signal converted by the reverse signal converter, so as to control a load L such as an electronic product.

To begin with, the optical receiver is a light receiving device to which optical signals, such as ultraviolet and infrared rays, emitted from the remote controller R are input. The optical signals are generated in various forms depending on loads L, so as to be input to the optical receiver.

The signal converter analyzes the received optical signal, generates frequency signal data for each of the inherent frequencies of electronic products, and performs a signal conversion to allow data communication based on a wired line. The signal converter detects the wavelength of the received optical signal, and determines the kind of a load coincident with a frequency corresponding to the detected wavelength. The data transmitter including a general amplifier/oscillator allows the frequency signal data to be carried on a transmission frequency (pilot frequency) and then transmitted by a wired line such as power and dedicated lines.

The frequency signal data transmitted by the wired line is detected by a plurality of data receivers located in different places. The data receiver includes an oscillator for oscillating a synchronous frequency and an amplifier for amplifying signals.

The reverse signal converter is a device for converting the detected frequency signal data back into an optical signal, and corresponds to the signal converter in the transmitting end.

Consequently, the data receiver and the reverse signal converter detect the frequency of the frequency signal data, and generate an optical signal as a control signal for an electronic product in correspondence with the detected frequency.

The optical transmitter emits the generated optical signal to control the electronic product as the load L.

As mentioned above referring to FIG. 1, the optical receiver, the signal converter, and the data transmitter are included in the transmitting end 30, whereas the data receiver, the reverse signal converter, and the optical transmitter are included in the receiving end 40. Of course, the transmitting and receiving ends 30 and 40 may also be integrated into a single unit.

The transmitting end and the receiving end 30 and 40 are connected to a wired line such as a power line and a dedicated line, and they are installed as many as needed in a residence, so that the remote controller R can be freely used in different places, so as to achieve the object of the present invention.

Figure 8:
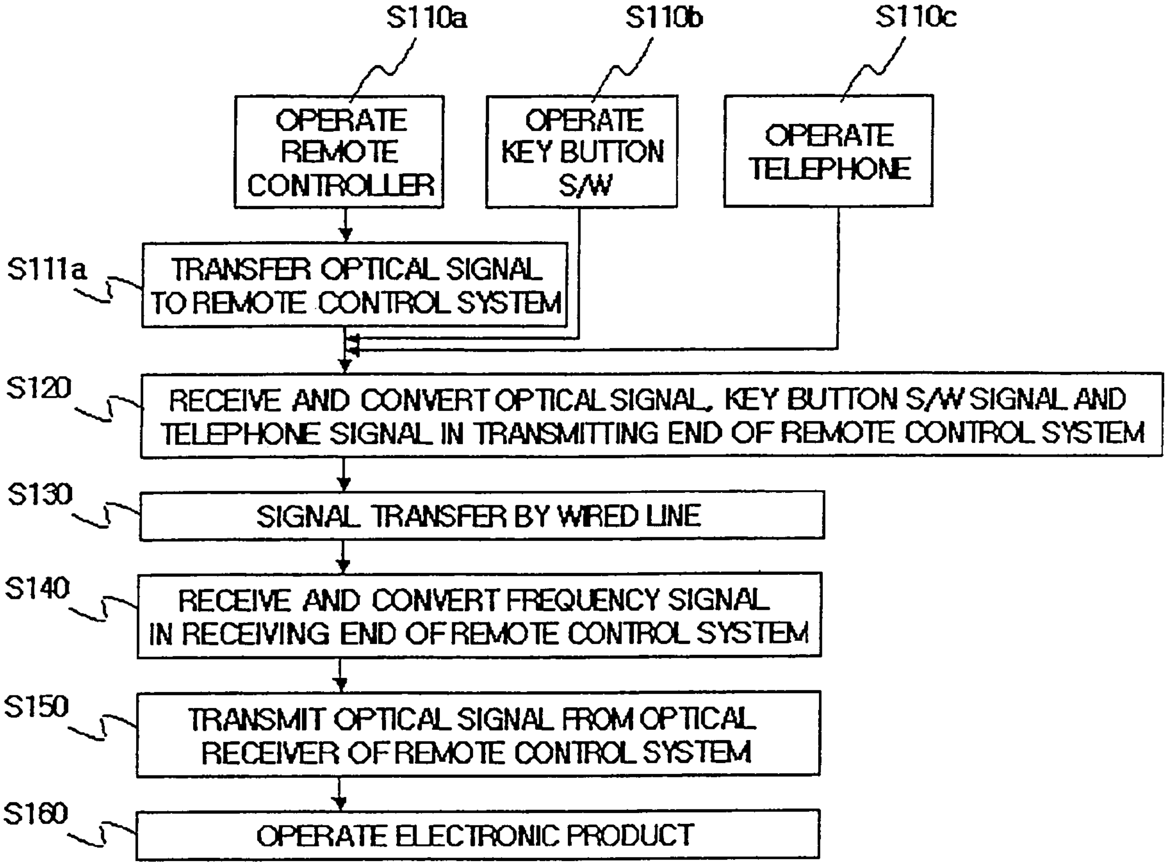
FIG. 8 is a flow chart illustrating the operation of the remote control equipment using the remote controller according to the detailed embodiment of the present invention.

FIG. 8 is a flow chart illustrating the operation of a remote control equipment using a remote controller according to a detailed embodiment of the present invention. The operation of the remote control equipment using the remote controller is described as follows.

A plurality of remote control equipments C using remote controllers R are installed in respective places segmented in a residence. Receiving and transmitting ends 40 and 30 are connected to each other by a wired line such as a power or dedicated line. Remote control equipments C between segmented-places are also connected to each other by the power or dedicated line.

In order to control the function of an electronic product as a load L located in a segmented-place different from the currently positioned place, the remote controller R is operated so that an optical signal emitted from the remote controller R is input to an optical receiving section of the receiving end 40 (S110$a$, S111$a$).

Of course, it is also possible to transmit an electrical signal by operating a key button switch or a telephone, instead of the remote controller (S110$a$, S110$c$). In this case, a control signal generated by a key button switch S/W and a control signal generated by a telephone all from the outside is received and converted into optical signals to be transmitted, so that a remote-controllable electronic product can be remotely controlled easily from the outside.

Various kinds of optical signals emitted from various kinds of remote controllers R may be received by the optical receiver, and the received optical signals are transferred to a signal converter connected to the rear stage of the optical receiver. The signal converter detects an optical signal having a predetermined wavelength for an electronic product as a load to be controlled, and generates its inherent frequency signal data in advance. Thereby, it is possible to control a plurality of different loads, and the risk of interference between data is also eliminated since the data conversion is made into frequency signal data in different frequency bands (S120).

After frequency signal data capable of wired data communication is generated, the data transmitter 30 including an amplifier and an oscillator amplifies the frequency signal data, carries it on a pilot frequency, and transmits it by the wired line such as the power and dedicated lines (S130).

The transmitted frequency signal data is delivered along the wired line, and it is synchronously detected by a plurality of data receivers located in different places. That is, frequency signal data transmitted to all the receiving ends 40 connected by the wired line is synchronously detected in this procedure. The data receiver synthesizes a synchronous frequency into the received signal, and detects frequency signal data from the pilot frequency. Since the detected signal data has been attenuated by external noise, it is preferable to use it after amplifying it. The detected frequency signal data is converted back into an optical signal by the reverse signal converter (S140).

The optical signal is transmitted by the optical transmitter, so as to control the electronic product as a load (S150, S160).

The remote control equipment C using the remote controller R according to the embodiment of the present invention makes it possible to control an electronic product located in a different place, segmented from the currently located place, by the remote controller, thereby realizing home automation without additional expense. In addition, it is possible to provide a remote control equipment commonly usable without interference between optical signals emitted from various kinds of remote controllers R.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, a remote control equipment according to the present invention has an advantage in that users can confirm transmission and reception states for the operation of an electric device as a load, and confirm the operating state of a load such as an electric device and electronic product.

In addition, limitations in the range controllable by a remote controller based on an optical signal is overcome to make it possible to control electronic products as loads located in different places. Further, a control signal generated by a key button switch (S/W) and a control signal generated by a telephone call from the outside is received and converted into optical signals and then transmitted, so that remote-controllable electronic products can be remotely controlled easily from the outside.

Furthermore, home automation can be realized inside home with the existing remote control scheme unchanged, without replacing a remote control equipment.

The invention claimed is:

1. A remote control equipment comprising:

a line filter for preventing frequency signal data from being leaked to the outside through a power line;

a transmitting end including: a) a power supply section including a rectifier for converting an input AC voltage into a DC voltage and a constant voltage section for stabilizing the DC voltage output from the rectifier; b) an oscillator/amplifier for performing an oscillation and an amplification by the voltage supplied from the constant voltage section to output a clock signal; c) a frequency divider for receiving the clock signal of the oscillator/amplifier and outputting a plurality of frequency-divided signals; d) a remote control keyboard for performing a selection operation through a plurality of key switches so as to provide the output signal from the frequency divider, as a controller signal, to an amplifying circuit of the oscillator/amplifier; e) a remote-control signal controller for controlling a remote control signal externally selected; f) a telephone signal controller for performing a control operation through a telephone line from the outside; g) a synchronous frequency-transmitter for transmitting selected frequency signal data to a power line or a dedicated line; and h) a light emitting section which is turned on in response to an input of a feedback signal generated as a light emitting section of a receiving end is turned on; and the receiving end including: i) a synchronous frequency-detector for detecting predetermined frequency signal data among a plurality of frequency-divided signals received by the power or dedicated line; j) a signal latch section for receiving the synchronously-detected signal output from the synchronous frequency-detector and generating a signal-latch toggle output-level; k) a relay driver for controlling a relay used for switching on a load; l) a detector for detecting and transmitting the operating state of the load as the load is switched on; and m) the light emitting section which is turned on as the load is switched on, wherein the remote control signal controller includes: an optical receiver for receiving an optical signal from a remote controller and a signal converter for detecting a wavelength of the optical signal received by the optical receiver and determining the kind of a load coincident with a frequency corresponding to the detected wavelength so as to generate frequency signal data.

2. The remote control equipment according to claim 1, wherein the transmitting end and the receiving end are integrated into a single unit.

3. The remote control equipment according to claim 1, wherein display means corresponding to each load is additionally disposed on the remote controller, and the display means includes a pair of LEDs of different colors for displaying an operating state and a non-operating state of the load, respectively.

4. The remote control equipment according to claim 1, wherein the telephone signal controller includes a signal converter for receiving a control signal generated by a telephone call and converting it into an inherent frequency signal data of the load.

5. The remote control equipment according to claim 1, wherein the remote control keyboard includes a signal converter for receiving a control signal generated by a key button switch and converting it into an inherent frequency signal data of the load.

6. The remote control equipment according to claim 1, wherein the receiving end further includes a reverse signal converter for converting the detected frequency signal data back into an optical signal, and an optical transmitter for transmitting the optical signal converted by the reverse signal converter so as to control the load.

7. The remote control equipment according to claim 1, wherein the receiving end further includes a filter for removing noise generated while the frequency signal data is transmitted through the power or dedicated lines.

8. A remote control method using a remote control equipment including a transmitting end and a receiving end, said transmitting end including a line filter, a power supply section, an oscillator/amplifier, a frequency divider, a remote control keyboard, a remote control signal controller including an optical receiver and a signal converter, a telephone signal controller, a synchronous frequency-transmitter, and a light emitting section including an LED, said receiving end including a synchronous frequency-detector, a signal latch section, a reverse signal converter, an optical transmitter, a relay driver, a detector, and a light emitting section including an LED, said remote control method comprising the steps of:

a) entering a wait state if a selected switch signal is off, and checking whether it is possible to transmit the selected switch signal through a power line or a dedicated line, if the selected switch signal is on;

b) if the checked result is that the transmission is possible, checking transmitters so as to start a data transmission of a corresponding transmitter according to the waiting order;

c) operating a load by switching on a relay or a transistor by an output signal of a received transmission data, displaying a reception state of the receiver through an LED, and outputting the reception state and the operating state of the load to the transmission end;

d) receiving the data from the transmitter and displaying the operating state of the receiver through the LED; and e) if a transmitted and received frequency signal is coincident with a predetermined frequency signal, displaying the operating state through the LED, or, if they are not coincident, entering a transmission wait state, the remote control method further comprising the steps of: receiving an optical signal from a remote controller by the optical receiver of the remote control signal controller, and detecting a wavelength of the optical signal received by the optical receiver and determining the kind of a load coincident with a frequency corresponding to the detected wavelength so as to generate frequency signal data using the signal converter.

9. The remote control method according to claim 8, further comprising the step of, if an input or transmitted and received frequency data communication signal is coincident with a predetermined frequency data signal, displaying the operating state through the LED, or, if they are not coincident, entering a transmission wait state.

10. The remote control method according to claim 8, wherein the operation of the load is detected by detecting a current provided to the load, and the load's operating signal detected by the current provided to the load is transferred to the transmitting end, so that the light emitting section is activated to emit light, thereby making it possible to check the state of the load.

11. The remote control method according to claim 8, wherein the load in the receiver is controlled to be turned on/off by switches in the transmitter in such a manner that each time one of a plurality of switches in the transmitter is selected and switched on, a frequency data signal predetermined for the switch is transmitted, and the receiver detects the transmitted data signal, so that if the load is in an off state, it is converted into an on state, and if it is in the on state, it is converted into the off state.

* * * * *